(12) United States Patent
Chattopadhayay et al.

(10) Patent No.: US 9,348,901 B2
(45) Date of Patent: May 24, 2016

(54) SYSTEM AND METHOD FOR RULE BASED CLASSIFICATION OF A TEXT FRAGMENT

(71) Applicant: MetricStream, Inc., Palo Alto, CA (US)

(72) Inventors: Arnab Kumar Chattopadhayay, Bangalore (IN); Dmitriy Rogatkin, Palo Alto, CA (US); Vidyadhar Phalke, Palo Alto, CA (US); Rani Lahoti, Palo Alto, CA (US)

(73) Assignee: MetricStream, Inc., Palo Alto, CA (US)

( * ) Notice: Subject to any disclaimer, the term of this patent is extended or adjusted under 35 U.S.C. 154(b) by 64 days.

(21) Appl. No.: 14/164,394

(22) Filed: Jan. 27, 2014

(65) Prior Publication Data
US 2015/0212976 A1 Jul. 30, 2015

(51) Int. Cl.
*G06F 17/27* (2006.01)
*G06F 17/30* (2006.01)
*G10L 19/00* (2013.01)

(52) U.S. Cl.
CPC ................. *G06F 17/30705* (2013.01)

(58) Field of Classification Search
CPC ............ G06K 9/00456; G06F 17/2229; G06F 17/30705; G10L 15/04; G10L 15/086
USPC ............................. 704/4, 9, 231, 218
See application file for complete search history.

(56) References Cited

U.S. PATENT DOCUMENTS

2007/0016614 A1* 1/2007 Novy .................. 707/104.1

* cited by examiner

*Primary Examiner* — Thierry L Pham
(74) *Attorney, Agent, or Firm* — The Law Office of Austin Bonderer, PC; Austin Bonderer

(57) ABSTRACT

A method for classifying a text fragment by applying one or more rule functions is provided. The method includes (i) obtaining a set of words from one or more sentences of the text fragment obtained from a multimedia content, (ii) mapping each word from the set of words with one or more category map tables to obtain a set of candidate vector, each candidate vector includes at least one category associated with each word, (iii) generating one or more category vectors based on the at least one category, (iv) applying rule functions on the one or more category vectors, (v) generating a candidate classification decision matrix based on the rule functions, and (vi) classifying the text fragment based on the candidate classification decision matrix. The candidate classification matrix includes results of each rule function applied on each of the category vector.

14 Claims, 4 Drawing Sheets

SYSTEM AND METHOD FOR RULE BASED CLASSIFICATION OF A TEXT FRAGMENT

BACKGROUND

1. Technical Field

The embodiments herein generally relate to text fragment classification systems, and, more particularly, to a system and method for rule based classification of a text fragment from a multimedia content.

2. Description of the Related Art

Automated text classification is the task of automatically mapping input text to one or more classes. With the increasing availability of large collections of text, classification plays a critical role in managing information and knowledge. Conventional algorithms (e.g., a machine learning algorithm) use statistical characteristics of raw corpus of relevant language vocabulary for classifying sentences in the same language. These methods transform the raw corpus into numbers based on statistical characteristics of the language. However, such methods can be implemented for generic use where statistical usage characteristics of the language yields adequate normalization. For example, stemming algorithm such as Porter's stemming use English language vocabulary statistics to stem a text in general use. However, for a bounded context in a specialized domain rule, where each word has a specific meaning, such an algorithm may not work since the algorithm may give multiple contexts for each such word. Accordingly, there remains a need for a classification system to classify text fragments that implements domain rules which is different than standard natural language processing (NLP) technique that uses primarily the probabilistic characteristics of the language concern.

SUMMARY

In view of the foregoing, an embodiment herein provides a method for classifying a text fragment by applying one or more rule functions. The method includes (i) obtaining a set of words from at least one sentences of the text fragment obtained from a multimedia content, (ii) mapping each word from the set of words with one or more category map tables to obtain a set of candidate vector, each candidate vector includes a category associated with each word, (iii) generating one or more category vectors based on the category, each category vector is specific to the at least one sentence based on the category, (iv) applying rule functions on the one or more category vectors, (v) generating a candidate classification decision matrix based on the rule functions, and (vi) classifying said text fragment based on the candidate classification decision matrix. Each rule function of the rule functions includes a rule vector and attributes that are specific to the rule vector. The candidate classification decision matrix includes results of each rule function applied on each category vector.

A rule selector may be applied on the rule functions to select an attribute associated with a rule function from the rule functions based on a number of non-zero values in the candidate classification decision matrix. The attribute includes a weight, a distance threshold, a vector threshold, a size selector, a position selector, and an attribute rule vector. A decision matrix may be computed based on the candidate classification decision matrix and the rule selector. A text rank is computed for the text fragment based on the decision matrix. The text rank is computed based on a result vector. The result vector is computed based on weights associated with the rule functions of the decision matrix. The text fragment is classified based on the text rank.

In another aspect, a system for classifying a text fragment by applying one or more rule functions is provided. The system includes (a) a memory unit that stores (i) a set of modules, and (ii) a database, (b) a display unit, (c) a processor that executes the set of modules. The set of modules include (i) a word obtaining module, executed by the processor, that obtains a set of words from at least one sentence of the text fragment obtained a multimedia content, (ii) a mapping module, executed by the processor, that maps each word from the at least one sentence with the set with one or more category map tables to obtain a set of candidate vector, each candidate vector includes at least one category associated with each word, (iii) a category vector generation module, executed by the processor, that generates a plurality of category vectors, (iv) a rule function module, executed by the processor, that applies rule functions on the one or more category vectors, (v) a candidate matrix generation module, executed by the processor, that generates a candidate classification decision matrix based on the rule functions, each category vector is specific to said at least one sentence based on said at least one category, (vi) a text fragment classification module, executed by the processor, that classifies the text fragment based on the candidate classification decision matrix. Each rule function of the rule functions includes a rule vector and attributes that are specific to the rule vector. The candidate classification decision matrix includes results of each rule function applied on each the category vector.

The set of modules further includes a rule selector module, when executed by the processor, applies a rule selector on the rule functions to select an attribute associated with a rule function from the rule functions based on a number of non-zero values in the candidate classification decision matrix. The attribute may include a weight, a distance threshold, a vector threshold, a size selector, a position selector, an attribute rule vector, or combinations thereof.

The set of modules further include a decision matrix computation module, when executed by the processor, computes a decision matrix based on the candidate classification decision matrix and the rule selector, and a text rank computation module, when executed by the processor, computes a text rank for the text fragment based on the decision matrix. The text rank is computed based on a result vector. The result vector is computed based on weights associated with the rule functions of the decision matrix. The text fragment is classified based on the text rank.

In yet another aspect, a non-transitory program storage device readable by a computer, and including a program of instructions executable by the computer to perform a method for classifying a text fragment, obtained from a multimedia content, based on a text rank by applying one or more rule functions is provided. The method includes (i) obtaining a set of words from at least one sentences of the text fragment obtained from a multimedia content, (ii) mapping each word from the set of words with one or more category map tables to obtain a set of candidate vector, the set of candidate vector includes at least one category associated with each word, (iii) generating one or more category vectors based on the category, each category vector is specific to the at least one sentence based on the category, (iv) applying rule functions on the one or more category vectors, (v) generating a candidate classification decision matrix based on the rule functions, and (vi) classifying said text fragment based on the candidate classification decision matrix. Each rule function of the rule functions includes a rule vector and attributes that are specific to the rule vector. The candidate classification decision matrix includes results of each rule function applied on each the category vector. A rule selector is applied on the rule functions to select an attribute associated with a rule function from the rule functions based on a number of non-zero values in the candidate classification decision matrix. The attribute includes a weight, a distance threshold, a vector threshold, a size selector, a position selector, and an attribute rule vector. A decision matrix is computed based on the candidate classification decision matrix and the rule selector. A text rank is computed for the text fragment based on the decision matrix. The text rank is computed based on a result vector. The result vector is computed based on weights associated with the rule functions of the decision matrix. The text fragment is classified based on the text rank.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
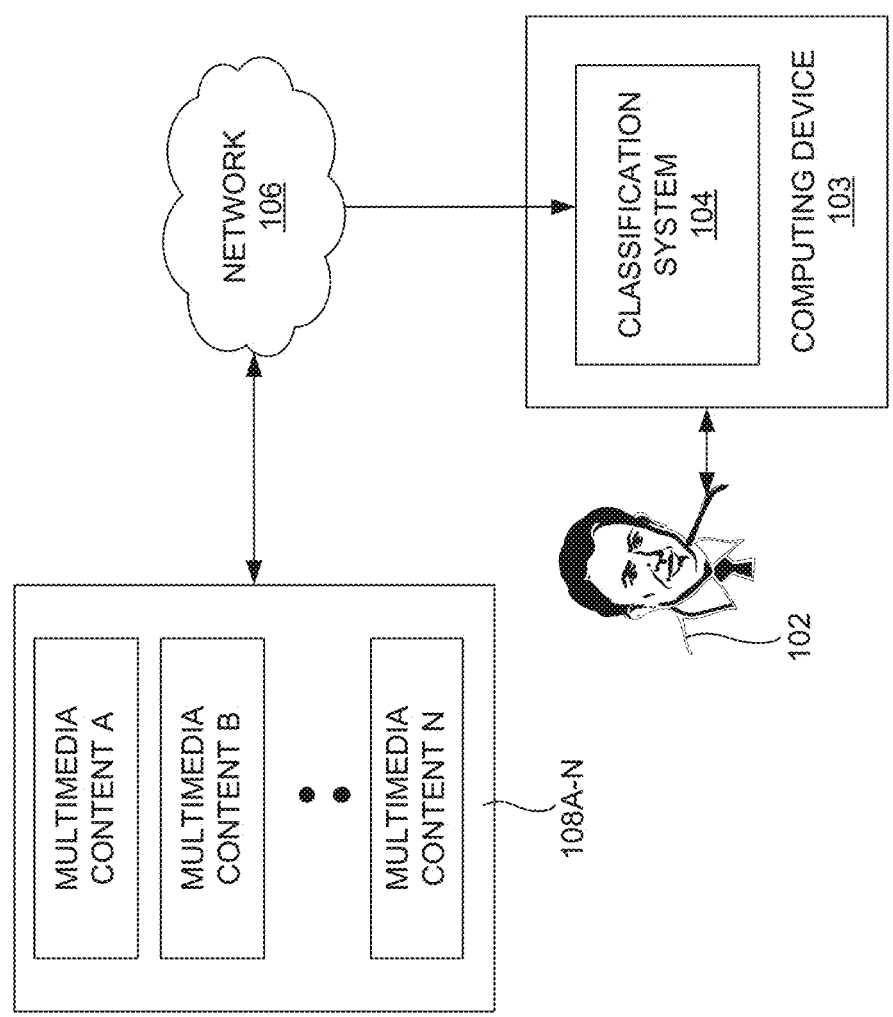
FIG. 1 is a system view illustrating a user interacting with a classification system 104 that classifies a text fragment obtained from one or more multimedia content into one or more classes according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a classification system to classify text fragments that implements domain rules which is different than a standard natural language processing technique that uses the probabilistic characteristics of the language. The embodiments herein achieve this by providing a classification system that classifies text (e.g., one or more sentences) obtained from a multimedia content (e.g., digitized handwritten notes, digitized spoken words, digitized audio content, texts from social media, email, etc). The classification system (i) obtains one or more words from one or more sentences of a text fragment, (ii) maps each word from the one or more words with one or more category map tables to obtain at a set of candidate category that includes at least one category associated with each word, (iii) generates a category vector for each sentence, with each element of the category vector represents a set of candidate categories which includes at least one element and each candidate category associated with one word, (iv) applies one or more rule functions on the category vector, each rule function includes a rule vector and attributes that are specific to the rule vector, (v) generates a candidate classification decision matrix based on the rule functions, the candidate classification decision matrix includes results of each rule function applied on the category vector, and (vi) classifies the text fragment based on the candidate classification decision matrix, (vii) apply rule function set connector function (or a rule selector) on the candidate classification decision matrix to obtain a decision matrix, from which a scalar value is derived which represents the text rank of the text fragment which is formed by the sentences, (viii) identify a classification of the text fragment based on the text rank.

Text fragment (Tf) is a sentence or a set of sentences for which classification has to be derived. In other words, the text fragment may be a portion of text or the entire text from a multimedia content, for which classification has to be derived. Sentence Tokenization Rule (TkR) is a set of rules that defines how to demarcate a sentence from a text fragment. Tokenization Function (Tkf) is a function that uses the sentence tokenization rule (TkR) and the text fragment (Tf) to create a vector of sentences (Sv). Sv represent a vector of sentences that based on Tkf. Word Tokenization Rule (WtkR) is a set of rules that defines how to demarcate a word in a sentence. Word Tokenization Function (Wtkf) is a function that uses the word tokenization rule (WtkR) and sentence_i to create Sv_i. Wv represents a vector of set of words. Each element of the vector represents a Sv_i in the form of a set Ws, of its constituent words.

For example:
{word_j, word_j+1, word_j+2, ..., word_M−1, word_M}, where, 0<j<=M, M=total number of words in $Sv\_i$, 0<i<size(Sv)

Category map set is defined and expressed as:
category_map_set={category_map_$m$, category_map_$m$+1, ..., category_map_$L$−1, category map $L$}, where, 0<m<=L, L=size of set category map set.

Cv represents a candidate word category vector that includes sets of candidate categories against each element of Sv_i. For example, Cv may be expressed as:
Cv=[wcc_b, wcc_b+1, ..., wcc_E−1, wcc_E], where, 0<b<E, E=size(sentence_i) and wcc_b={wc_d, wc_d+1, ..., wc_F−1, wc_F}, where, 0<d<=F, F=number of categories matching against a word_j in each category_map_set_m. Thus, sentence_i=>Cv (sentence_i can be mapped to Cv).

A rule function R(f) is defined and expressed as:
Rule Function Rf={weight, VT, DT, [RV_i, RV_i+1, ..., RV_n−1, RV_n]}, where: weight, VT, DT=Real Number, RV=Rule Vector, 0<i<=n, VT=Value Threshold, DT=Distance Threshold. VT and DT are defined as Mutually Exclusive. This implies at any point of time, either VT or DT may have value greater than zero (e.g., >0). However, it is to be understood to a person having ordinary skill in the art that the default value for both of them is 0, which means they are not defined.

SZ=Size Selector. It is a Real Number, and represents the minimum length of a sentence in terms of words. When applied against a sentence if is evaluated positive, only then, the Rf_i will be applicable on the sentence.

PS=Position Selector. It is a Real Number that represents relative positioning rule of sentence in the text fragment. It is applied to the complete text fragment and if evaluated positive, only then the Rf_i is applicable for processing.

ARV=Attribute Rule Vector. It is a vector of attribute key: value pair which will be applied to overall text fragment. The Rf_i is applicable only if the rule is evaluated positively. The definition of SZ, PS and ARV is optional and if not defined, are not applicable to Rf_i. RV_x={[roc_1, roc_1+1, ..., roc_q−1, roc_q], [so1, so2, so3]}, where: roc=Rule Operation Category, 0<1<=q. Thus, so=Set operation; Max=3. Connector C is a rule which transforms a Vector or Matrix into a scalar value. Rf Set Connector is expressed as, C_Rf=ADD.

Rule function selector (Rf_Selector), is a vector having a size=size(Rf Set). The rule selector includes one or more size selectors for each Rf_i. A size selector decides how many non-zeros in the Rf_i of matrix M enables that Rf_i to be applicable. Less number of non-zero values will set the Rf_i to 0, effectively nullifying the effect of that Rf_i.

Rule Selector (RS,) includes a vector of Rule Mask of size=size(Rf set). The rule section includes one or more applications that define way of masking the impact of some rules. This is multiplied to each row in Matrix M. Each row in matrix M may be considered as a vector and the RS has same size. A '.' represent a DOT product, in this case used to multiply a classification decision matrix with a rule selector to obtain a transpose classification decision matrix. An example of a classification rule is defined as: (CR_1): 0-3: "Need Manual Classification", and 4-8: "Complaining" class.

A category may be defined as a string of any length and may contain any characters (e.g. A to Z, special characters, UNICODEs, etc.). The mapping between words and corresponding categories may be an essential part of the detection process. The category may group several words which identify a certain object, a certain action, a certain class of objects, terms, abstractions, etc. Therefore, separate categories may be created for past form of verbs or all variants may be defined under same category applicable for plural forms of nouns. The category may also include misspelled words and words in different languages.

In one example embodiment, the decision of content in the categories may be made by a user who uses them for rules creation. Multiple category tables may be introduced for convenience and to dynamically changed categories content. In another embodiment, if a category as 'COMPANY NAME' contains a list of some companies, the table defining them may be switched to reconfigure analyzing to work with different company's names without manipulating other tables. The category may be considered as specific tables that may define a base knowledge of a system, and other tables add a specific knowledge to the category.

The computing method may be equally useful for analytics of large volume of data. The fragmented unstructured information or the text fragments may be a web page fragments (e.g., actual blog text filtering noise coming from advertisement, discussions, etc.), in one example embodiment. The fragmented unstructured information or the text fragments may be fragments of human speech which may be exposed in internet specific communication, abbreviations, emotion signs, etc. in another example embodiment.

Referring now to the drawings, and more particularly to FIGS. 1 through 4, where similar reference characters denote corresponding features consistently throughout the figures, there are shown preferred embodiments.

FIG. 1 is a system view illustrating a user 102 interacting with a classification system 104 that classifies a text fragment obtained from one or more multimedia content 108A-N into one or more classes according to an embodiment herein. The one or more sentences (including the words) from the text fragment may be any of digitized handwritten notes, digitized spoken words, digitized audio content, texts from social media, email, etc. The text fragment (that includes one or more sentences such as content from social messages, emails) is obtained through a network 108, in one example embodiment. The text fragment is obtained from a locally stored database (not shown in FIG. 1), in another example embodiment. The text fragment may also be obtained from an image, by extracting the text fragment from the image, in yet another example embodiment. The classification system 104 classifies the text fragment based on a candidate classification decision matrix. The classification system 104 may be executed on a computing device 103 such as, but not limited to a personal computer, a mobile communication device, a laptop, a personal digital assistant, a remotely located server, etc. The computing device 103 includes a processor (not shown in FIG. 1) and a memory (not shown in FIG. 1) that stores instructions.

Figure 2:
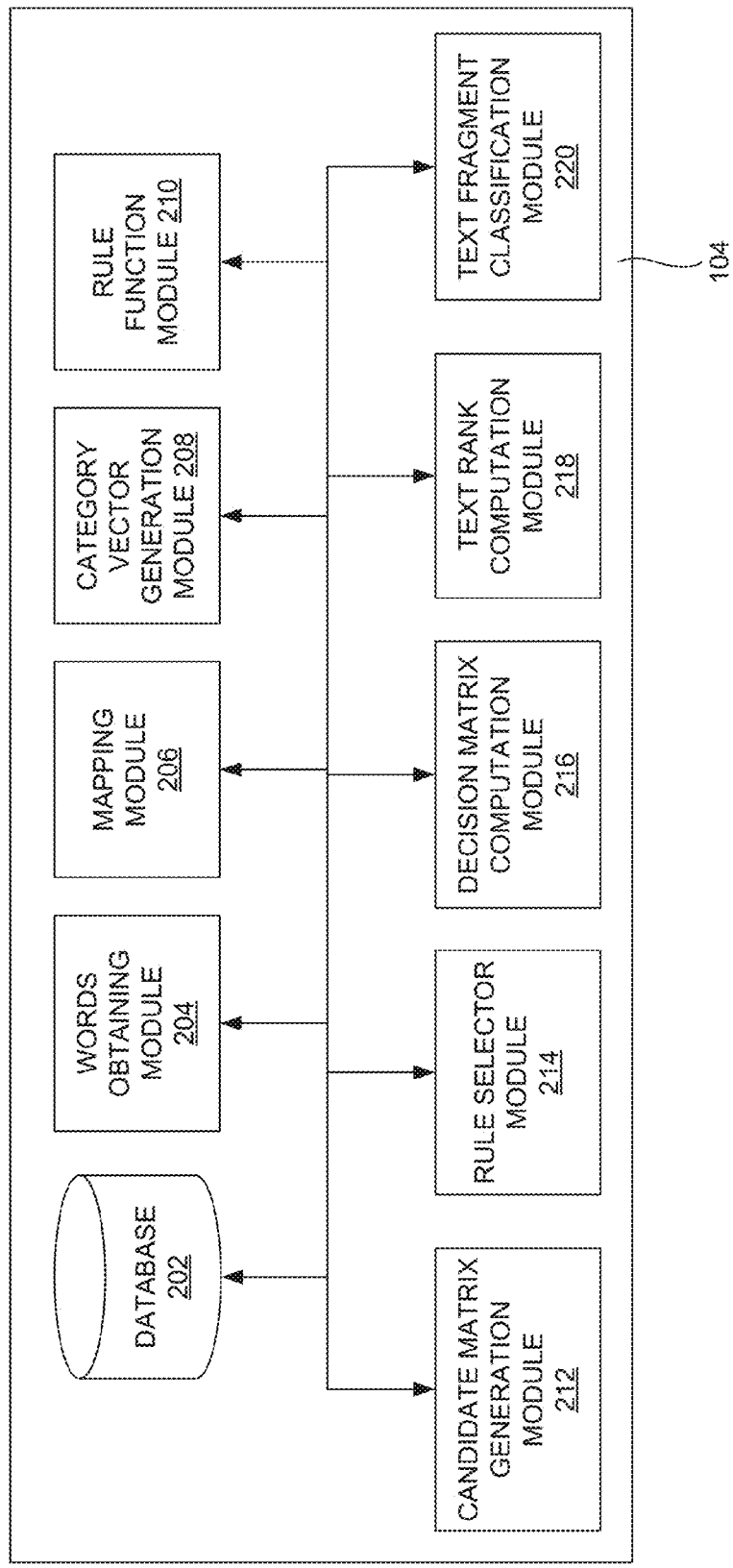
FIG. 2 illustrates an exploded view of the classification system of FIG. 1 according to an embodiment herein.

FIG. 2, with reference to FIG. 1, illustrates an exploded view of the classification system 104 of the computing device 103 of FIG. 1 according to an embodiment herein. The classification system 104 includes a database 202 a words obtaining module 204, a mapping module 206, a category vector generation module 208, a rule function module 210, a candidate matrix generation module 212, a rule selector module 214, a decision matrix computation module 216, a text rank computation module 218, and a text fragment classification module 220. The processor when configured by the instructions executes the words obtaining module 204, the mapping module 206, the category vector generation module 208, the rule function module 210, the candidate matrix generation module 212, the rule selector module 214, the decision matrix computation module 216, the text rank computation module 218, and the text fragment classification module 220.

The database 202 stores (i) text fragments that includes the one or more sentences, (ii) one or more category map tables, and (iii) one or more rule functions that include one or more rule vectors (or rule operations), and attributes. The attributes may include, but not limited to, weight, a value threshold, a distance threshold, rule connectors, etc. The one or more rule functions may be defined as set operations as shown in the below table and may be expressed as:

| Positive evaluation part | Opposite counterpart |
|---|---|
| Includes all from a set R ∩ C = R | No one from a set R ∩ C = ∅ |
| Includes any category from each set of two R1 ∩ C ∩ R1 and R2 ∩ C ∩ R2 | None, or from only one of sets but not from both R1 ∩ C = ∅ or R2 ∩ C = ∅ |
| Includes any category from first and | Includes any category from first set |

| Positive evaluation part | Opposite counterpart |
|---|---|
| second sets of two $R1 \cap C \cap R1$ and $R2 \cap C \subseteq R2$ | but none from second $R1 \cap C \subseteq R1$ and $R2 \cap C = \emptyset$ |
| Includes any category from a set $R \cap C \subseteq R$ | At least one from a set doesn't appear $R \cap C \neq R$ |
| Includes any category from each set of two in a distance $R1 \cap C_i \subseteq R1$ and $R2 \cap C_j \subseteq R2$ and $abs(i-j) < D$ | None, or from any set but not in distance $R1 \cap C = \emptyset$ and $R2 \cap C = \emptyset$ or $R1 \cap C_i \subseteq R1$ or $R2 \cap C_j \subseteq R2$ and $abs(i-j) > D$ or $R1 \cap C \subseteq R1$ and $R2 \cap C = \emptyset$ or $R1 \cap C = \emptyset$ and $R2 \cap C \subseteq R2$ |
| Includes any category from first and second sets of two in a distance $R1 \cap C_i \subseteq R1$ and $R2 \cap C_j \subseteq R2$ and $abs(i-j) < D$ | Includes any category from first set but none from second in a distance $R1 \cap C_i \subseteq R1$ and $R2 \cap C_j \subseteq R2$ or $abs(i-j) > D$ or $R1 \cap C \subseteq R1$ and $R2 \cap C = \emptyset$ |

The classification system 104 includes a positioning attribute obtaining module (not shown in FIG. 2) that processes an input from the user 102 to indicate the text fragment to be evaluated and classified. For example, input from the user 102 that indicates the text fragment to be evaluated and classified may be expressed as:

| Positioning attribute | Description |
|---|---|
| First N (%) sequential sentences | A rule has to be evaluated positively for first N or N % of total number of sentences in analyzed text fragment |
| Last N (%) sequential sentences | A rule has to be evaluated positively for last N or N % of total number of sentences in analyzed text fragment |
| Any N (%) sequential sentences | A rule has to be evaluated positively for any N or N % of total number of sentences in analyzed text fragment |
| Any N (%) sentences | A rule has to be evaluated positively for any N or N % of total number of sentences in analyzed text fragment |

Percentage may range from 0 to 100. For example, when specified as 0, none of the sentences are evaluated by a rule function, and when specified 100, all sentences of analyzed text fragment have to be evaluated positively by the rule function.

The one or more attributes are expressed with real values by way of example:

For a first rule function Rf[1]:

| Attributes | Value |
|---|---|
| Weight (w) | 1 |
| Value threshold (VT) | 0 |
| Distance threshold (DT) | 0 |
| Size_Selector (SZ) | 5 |
| Rule operations (RV) | [ { {DISFAVOR, COMPANY_NAME}, {RCi $\cap$ C $\subseteq$ RCi}}, ] |
| Rule connector (RC) | ADD |

For a second rule function Rf[2]:

| Attributes | Value |
|---|---|
| Weight (w) | 1 |
| Value threshold (VT) | 1 |
| Distance threshold (DT) | 0 |
| Position_Selector (PS) | >=First 1% Sequential |
| Rule operations (RV) | [ {{COMPLAIN, REGULATOR}, {RCi $\cap$ C $\subseteq$ RCi}} ] |
| Rule connector (RC) | ADD |

For a third rule function Rf[3]:

| Attributes | Value |
|---|---|
| Weight (w) | 1 |
| Value threshold (VT) | 0 |
| Distance threshold (DT) | 1 |
| Attribute Rule Vector (ARV) | [ {source: USA}, {operation: AND}, {author_profile: customer} ] |
| Rule operations (RV) | [ {{LEGAL, NEGATIVE}, {RCi $\cap$ C $\subseteq$ RCi}} ] |
| Rule connector (RC) | ADD |

Similarly, the classification system 104 includes a sizing attribute obtaining module (not shown in FIG. 2) that obtains one or more sizing attributes (e.g., an input from the user 102).

The sizing attributes are expressed as:

| Sizing attribute | Description |
|---|---|
| Apply rule when text fragment size in sentences less than N | N can be any value greater than 1 |
| Apply rule when text fragment size in sentences greater than N | N can be any positive value |

Attributes such as for example, geo location, time, publishing source, number of views, number of comments, author profile influence can be applied for a rule function, and additionally notifying when a rule has to be evaluated positively or not after a positive rule evaluation based on the rule function.

$$Rr = r*A,$$

Where A is a vector of attributes which were confirmed for an analyzed fragment. Not 0 result vector is considered as a final positive rule evaluation preserving initial result value r.

The words obtaining module 204 obtains a set of words from one or more sentences of a text fragment (Tf) that is obtained from a multimedia content. For example, Tf="I hate companies like company A are not taking customer's needs seriously. I will have to take it to the authority very soon. They breach contract very often but gets scott free"

$Sv=Tkf(Tf,TkR)$[by the above definitions]

Thus, the one or more sentences are represented as a sentence vector (Sv) and expressed as:

```
Sv = [
"I hate companies like company 'A' are not taking customer's needs
seriously."
"I will have to take it to the authority very soon."
"They do not adhere to contract but gets often scott free".
]
Sv_i:
Ws = Wtkf( Sv_i, WtkR) [From definitions]
Wv_i = Ws [From definitions]
```

Thus, the set of words from the above sentences are represented by Wv (a word vector) and is given in accordance with the following expression:

```
Example: Wv = [
    {"I", "hate", "companies", "like", "Company A", "are", "not", "getting", "customer's", "needs", "seriously."},
    {"I", "will", "have", "to", "take", "it", "to", "the", "authority", "very", "soon."},
        {"They", "do", "not", "andere", "to", "contract", "but", "gets", "often", "scott", "free"}
    ]
Thus, Size(Wv) = 3 = Size(v).
```

The mapping module 206 maps each word from the set of words with one or more category map tables to obtain a set of candidate vector. Thus, for the set of words, a multiple set of candidate vector (or multiple set of candidate categories) are formed. Each of the multiple set of candidate vector includes at least one category associated with each word.

The mapping of each word is illustrated with an expression below:

```
For each Ws in Wv_i:
temp_vector = [ ]
for each w in Ws:
wcc_b = map_category( w, category_map_set )
temp_vector.add(wcc_b)
Cv_i = temp_vector (From definitions).
```

The category vector generation module 208 generates one or more category vectors (Cv) that are specific to each of the above sentences based on the multiple set of candidate categories. In other words, each category vector is specific to the sentence based on the category. For example, the one or more category vectors are generated and expressed as:

```
Cv = [
    [
    { }, {DISFAVOR}, {OBJECT}, {FAVOR,SIMILAR},
    {COMPANY_NAME}, {IS}, {NEGATIVE}, {DELIVER}, {OBJECT},
    {NECESSITY},
        {ATTENTION,REAL}
    ],
    [
    { }, { }, {ACTION}, { }, {ACTION, COMPLAIN}, { }, { }, { },
```

-continued

```
{REGULATOR}, {EMPHASIS}, {RUSH}
    ],
    [
    { }, {ACTION}, {DISLIKE, NEGATIVE}, {FOLLOW}, { },
{LEGAL}, { }, { }, {OCCURENCE}, { }, {PRICE, NEGATIVE}
    ]
]
```

The rule function module 210 applies one or more rule functions on the category vector (Cv). Each rule function includes a rule vector and attributes that are specific to the rule vector. The one or more rule functions (Rf) may be expressed as:

```
M = [ ][ ] // size(M) = size(Cv) x size(Rf)
rf_ctr = 1
for each rf in Rf: // For each rule function
Cv_ctr = 1
for each wcv in Cv: // For each wcv. Every time the flow goes to next rf,
the loop starts from first wcv
result[size(wcv)]
result_ctr = 1 // result_ctr <= size(wcv)
for each wcc in wcv:
result[result_ctr] = apply_rule( wcc, rv, rERV, rERC )
result_ctr += 1
M[Cv_ctr][rf_ctr] = apply_connector( result, rERC )
Cv_ctr += 1 // Cv_ctr <= size(Cv)
rf_ctr += 1 // rf_ctr <= size(Rf).
```

Each rule function of the rule functions includes a rule vector and attributes that are specific to the rule vector.

First, a size selector (SZ) is applied (e.g., a size selector rule). From the above table, it is evident that SZ is defined as 1 for Rf[1], which implies, only sentences with size >=SZ word will be evaluated under Rf[1]

For a first category vector (Cv[1]), the size=11 which is >SZ. Thus, Cv[1] qualifies for Rf[1] evaluation.

For example, when the first rule function (e.g., Rf[1]) and rule connectors is applied for the first category vector Cv[1] of the Cv, the result is expressed as:

```
Apply Rf[1] on Cv[1]:
    0 : {DISFAVOR,COMPANY_NAME} ∩ { } = Ø (
[DISFAVOR,COMPANY_NAME] ⊉ Ø)
    1 : {DISFAVOR,COMPANY_NAME} ∩ {DISFAVOR} =
{DISFAVOR} ({DISFAVOR,COMPANY_NAME} ⊆ {DISFAVOR})
    0 : Similar to first line
    0
    1 : Similar to second line but with COMPANY_NAME as intersection
    0
    0
    0
    0
    0
    0
result = [0, 1, 0, 0, 1, 0, 0, 0, 0, 0, 0]
Applying connector Rf[1].RC, the output= 1 + 1 = 2
```

The first category vector Cv[1] is specific to the first sentence (e.g., "I hate companies like company 'A' are not taking customer's needs seriously.").

Similarly, a position selector (PS) is applied for Rf[2]. Since PS is defined only for Rf[2] i.e., 1 of 3 sentences=0.33. Number of sentences where Rf[2] is positively evaluated=1 which is >0.33. Hence the PS is evaluated positively.

=Similarly, when the first rule function R(f1) is applied on a second category vector Cv[2] of the Cv, the result is expressed as:

```
Apply Rf[1]on Cv[2]:
    0 : {DISFAVOR,COMPANY _NAME} ∩ { } = Ø (
[DISFAVOR,COMPANY_NAME] ∌ Ø)
    0 : {DISFAVOR,COMPANY _NAME} ∩ { } = Ø
    0 : {DISFAVOR,COMPANY _NAME} ∩ {ACTION} = Ø
    0
    0 : {DISFAVOR,COMPANY _NAME} ∩ {ACTION,COMPLAIN} = Ø
    0
    0
    0
    0 : {DISFAVOR,COMPANY _NAME} ∩ {REGULATOR} = Ø
    0 : {DISFAVOR,COMPANY _NAME} ∩ {EMPHASIS} = Ø
    0 : {DISFAVOR,COMPANY _NAME} ∩ {RUSH} = Ø
result = [0, 0, 0, 0, 0, 0, 0, 0, 0, 0, 0]
Applying connector Rf[1].RC, the output is 0.
```

The second category vector Cv[2] is specific to the second sentence (e.g., "I will have to take it to the authority very soon.").

It is further evident from the above attributes and corresponding value table, ARV is defined for Rf[3], which in this case, is evaluated as positive (assuming that the person who wrote the text is from USA and he/she is a customer of company A). Hence, the result of Rf[3] n, 0<n<=3 with is multiplied with 1 which results in the same value. Thus, when the first rule function R(f1) is applied on a third category vector Cv[3] of the Cv, the result is expressed as:

```
Apply Rf[1]on Cv[3]:
    0 : {DISFAVOR,COMPANY_NAME} ∩ { } = Ø (
[DISFAVOR,COMPANY_NAME] ∌ Ø)
    0 : {DISFAVOR,COMPANY_NAME} ∩ {ACTION} = Ø
    0 : {DISFAVOR,COMPANY_NAME} ∩ {DISLIKE,NEGATIVE} = Ø
    0 : {DISFAVOR,COMPANY_NAME} ∩ {FOLLOW} = Ø
    0
    0 : {DISFAVOR,COMPANY_NAME} ∩ {LEGAL} = Ø
    0
    0
    0 : {DISFAVOR,COMPANY_NAME} ∩ {OCCURENCE} = Ø
    0 : {DISFAVOR,COMPANY_NAME} ∩ { } = Ø
    0 : {DISFAVOR,COMPANY_NAME} ∩ {PRICE,NEGATIVE} = Ø
result = [0, 0, 0, 0, 0, 0, 0, 0, 0, 0]
Applying connector Rf[1].RC, the output is 0.
```

The third category vector Cv[3] is specific to the third sentence (e.g., "They do not adhere to contract but gets often scoff free").

The first rule function Rf[1] is illustrated and applied for the Cv[1], Cv[2], and Cv[3] by way of example for better clarity of the above mentioned embodiments. It is to be understood for a person having ordinary skill in the art that other rule functions (e.g., Rf[2], Rf[3], . . . Rf[n]) may be applied.

The candidate matrix generation module 212 generates a candidate classification decision matrix (M) based on the rule functions (e.g., Rf[1], Rf[2], and Rf[3]) applied to the one or more category vectors (e.g., Cv[1], Cv[2], and Cv[3]. The candidate classification decision matrix (M) includes results of each rule function applied on each category vector, which is expressed as:

$$M = \begin{matrix} & Cv[1] & Cv[2] & Cv[3] \\ Rf[1] & 2 & 0 & 0 \\ Rf[2] & 0 & 2 & 0 \\ Rf[3] & 1 & 0 & 3 \end{matrix}$$

The rule selector module 214 applies a rule selector to select an attribute associated with a rule function from the rule functions based on a number of non-zero values in the above candidate classification decision matrix (M). The rule selector module 218 may apply a rule selector to select an attribute associated with a rule function from the rule functions based on a number of zero values in the above candidate classification decision matrix (M), in one example embodiment. The attribute include, but not limited to, at least one of a weight, a distance threshold, a vector threshold, a size selector, a position selector, an attribute rule vector (e.g., geo location, time, author profile), or combinations thereof etc.

The decision matrix computation module 216 computes a decision matrix based on the candidate classification decision matrix (M) and the rule selector applied by the rule selector module 214. A rule selector (RS) [1, 1, 0] specific to the second rule function Rf[2]] is applied to the above candidate classification decision matrix (M), in one example embodiment. Essentially each element from each column of M is multiplied with corresponding column element of transpose rule selector (RS') using a DOT product. Thus, the decision matrix (M') is expressed as:

$$M' = M \cdot RS'$$

$$M' = \begin{bmatrix} 2 & 0 & 0 \\ 0 & 2 & 0 \\ 1 & 0 & 3 \end{bmatrix} \cdot \begin{bmatrix} 1 \\ 1 \\ 0 \end{bmatrix}$$

$$M' = \begin{matrix} & Cv[1] & Cv[2] & Cv[3] \\ Rf[1] & 2 & 0 & 0 \\ Rf[2] & 0 & 2 & 0 \\ Rf[3] & 0 & 0 & 0 \end{matrix}$$

The rule selector [1, 1, 0] is specific to one or more attributes associated with the second rule function Rf[2]. Since, the attributes such as the value threshold (VT) and the distance threshold (DT) are not defined for the first rule function Rf[1], the rule selector specific to the first rule function Rf[1] is not selected and applied. The attributes such as weight (W=1) and the distance threshold (DT=1) are defined for the third rule function Rf[3]. Since, the distance threshold as depicted in the candidate classification decision matrix is 2 (e.g., the difference between the $1^{st}$ and $3^{rd}$ value of the row Rf[3] in the candidate classification decision matrix (M)), which does not match with the distance threshold (DT=1) defined for the third rule function Rf[3], the rule selector specific to the Rf[2] is applied. Since the distance threshold for Rf[1] and Rf[2] is set to 0, a value threshold (VT) for each of the Rf[1] and Rf[2] is computed and expressed as:

VT<=SUM(Rf[1])=2, VT<=SUM(Rf[2])=2.

The classification system 104 may include a value threshold computation module, a distance threshold computation module (not shown in FIG. 2) for computing a value threshold and a distance threshold from applications of different rule functions. A result vector is computed based on the value thresholds of the first rule function Rf[1] and the second rule function Rf[2], in the preferred embodiment. Since the DT does not match, the result vector is computed based on the value thresholds of the first rule function Rf[1] and the second rule function Rf[2] and corresponding weights. It is to be understood to a person having ordinary skill in the art that the result vector may be computed using the distance threshold. The classification system 104 may include a result vector computation module (not shown in FIG. 2) that computes the result vector. The result vector is computed and expressed as:

Result_Vector=[2,2], since $w$=1 for both $Rf$[1] and $Rf$[2],

Result_Vector[$i$]=(SUM($Rf[i]$)*$w$)

The result vector is computed based on weights associated with the rule functions of the decision matrix, in one example embodiment.

The text rank computation module 218 computes a text rank for the text fragment based on the result vector that is obtained from the decision matrix. In the preferred embodiment, the text rank computation module 218 computes the text rank for the text fragment based on weights associated with the rule functions of the decision matrix. The text rank is computed and expressed as:

Text Rank,TR=Apply $C\_Rf$=SUM(Result_Vector)=4.

Thus, the text rank of the sentences (TR)=4. Based on the classification rule (CR) stored in the database 202, the text fragment classification module 220 classifies the text fragment into "Complaining" class.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program content accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
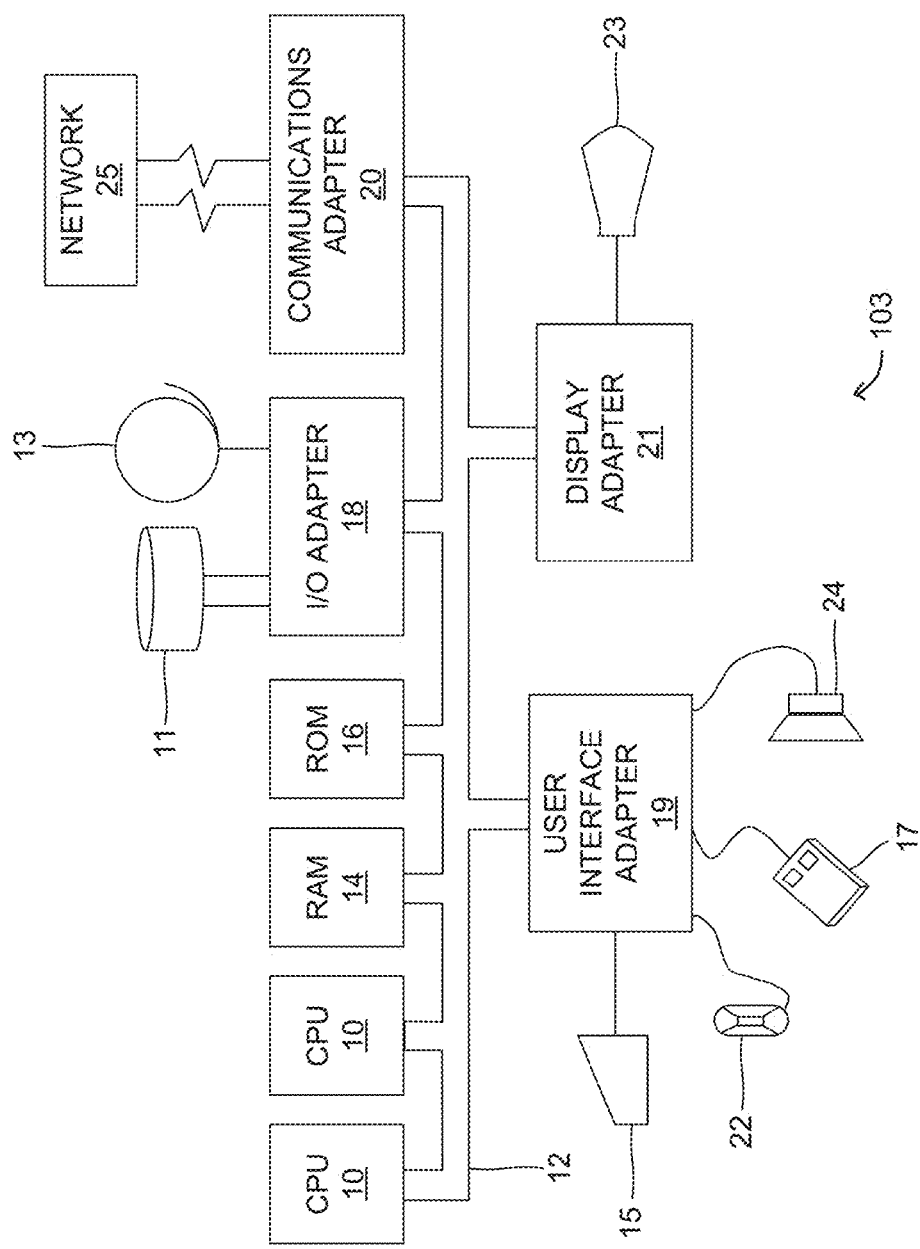
FIG. 3 illustrates a schematic diagram of the computing device 103 of FIG. 1 used in accordance with the embodiments herein.

A representative hardware environment for practicing the embodiments herein is depicted in FIG. 3. This schematic drawing illustrates a hardware configuration of an information handling/computing device 103 of FIG. 1 in accordance with the embodiments herein. The system comprises at least one processor or central processing unit (CPU) 10.

The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 4:
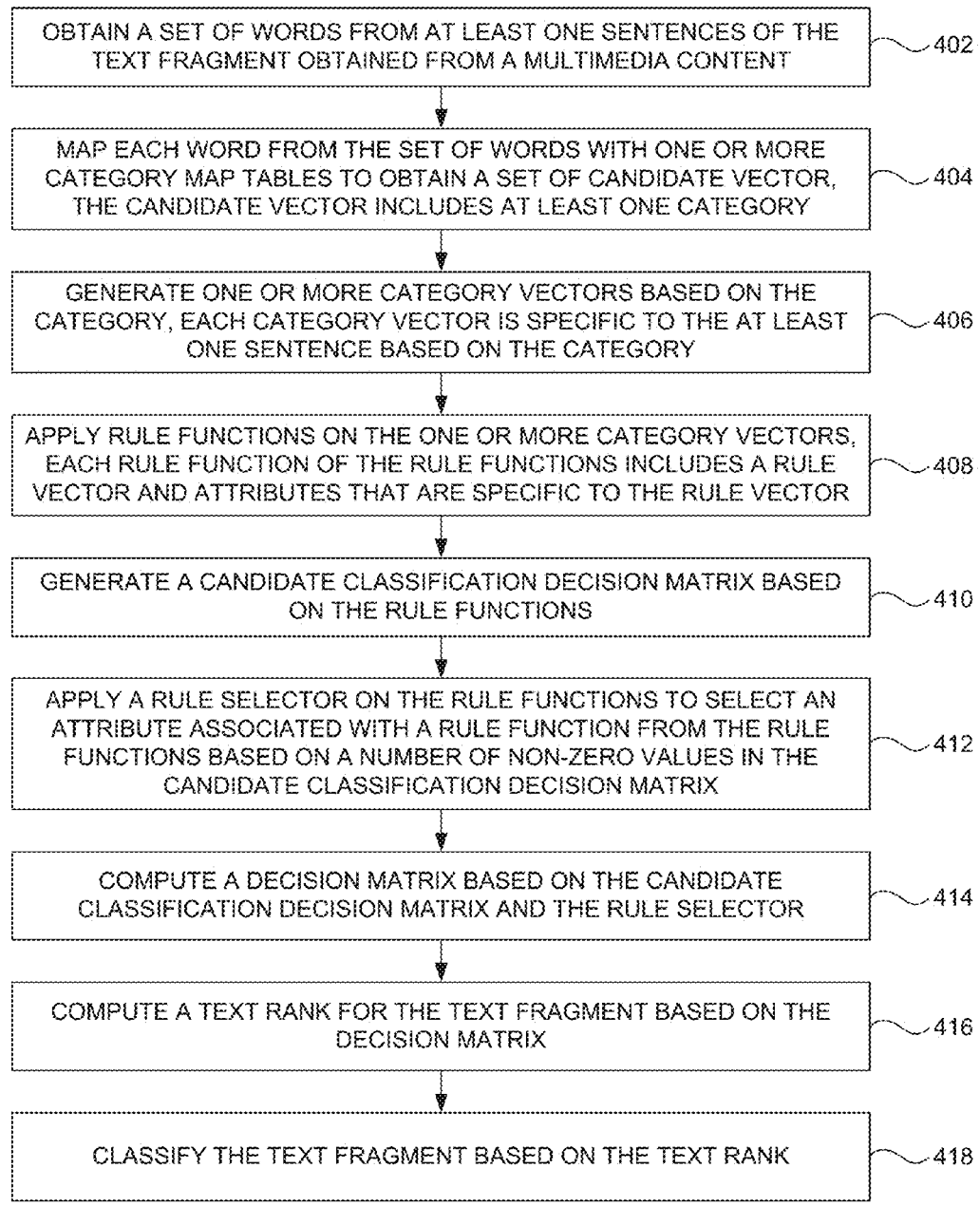
FIG. 4 is a flow diagram illustrating a method for classifying a text fragment based on a candidate classification decision matrix using the classification system of FIGS. 1-3 according to an embodiment herein.

FIG. 4 is a flow diagram illustrating a method for classifying a text fragment based on a candidate classification decision matrix using the classification system of FIGS. 1-3 according to an embodiment herein. In step 402, a set of words of one or more sentences of the text fragment from a multimedia content is obtained (e.g., using the words obtaining module 204 of FIG. 2). In step 404, each word from the set of words is mapped with one or more category map tables to obtain a set of candidate vectors (e.g., using the mapping module 206 of FIG. 2). Each candidate vector of the set of candidate vectors includes at least one category associated with each word. In step 406, one or more category vectors are generated (e.g., using the category vector generation module 208 of FIG. 2). Each category vector of the one or more category vectors is specific to the at least one sentence based on the at least one category. In step 408, rule functions are applied (e.g., using the rule function module 210 of FIG. 2) on the one or more category vectors. Each rule function of the rule functions includes a rule vector and attributes that are specific to the rule vector.

In step 410, a candidate classification decision matrix is generated (e.g., using the candidate matrix generation module 212 of FIG. 2) based on the rule functions. The candidate classification decision matrix includes results of each rule function applied on each the category vector. In step 412, a rule selector is applied on the rule functions (e.g., using the rule selector module 214 of FIG. 2) to select an attribute associated with a rule function from the rule functions based on a number of non-zero values in the candidate classification decision matrix. In step 414, a decision matrix is computed (e.g., using the decision matrix generation module 216 of FIG. 2) by multiplying each column of the candidate classification decision matrix with corresponding column element of a transpose of the rule selector. In step 416, a text rank is computed for the text fragment (e.g., using the text rank computation module 218 of FIG. 2) based on the decision matrix. In step 418, the text fragment is classified (e.g., using the text fragment classification module 220 of FIG. 2) based on the text fragment. The attributes includes a weight, a distance threshold, a vector threshold, a size selector, a position selector, and/or an attribute rule vector. The text rank may be computed based on a result vector. The result vector may be computed based on weights associated with the rule functions of the decision matrix.

Unlike most of the machine language algorithms that classifies using statistical characteristics of a corpus, the classification system 104 uses contextual pattern to classify text fragments. The classification system 104 transforms a text fragment into sentence vector, then each sentence vector into word vector and each element of word vector to a mapping category vector. The transformation uses contextual rule (e.g., the rule functions) when a mapping between a word and its associating classes are established.

The classification system 104 implements one of a natural language processing technique to further describe how domain specific pattern can be used to identify the most adequate rule set (e.g., a specific rule function) from the corpus of domain rules (e.g., a set of rule functions). The classification system 104 uses vector distance measures (e.g., VT and/or DT) to derive an appropriate rule set (e.g., an appropriate rule function is applied based on a value associated with VT and the DT), which does not convert the sentence(s) into its numeric representation using statistical characteristics when compared to conventional method. The embodiments herein described and implemented using the classification system 104 allows to retain the contextual pattern present in the original sentences.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for classifying a text fragment by applying one or more rule functions, said method comprising:
   (i) obtaining, by a processor, a set of words from at least one sentence of said text fragment obtained from a multimedia content;
   (ii) mapping, by said processor, each word from said set of words with a plurality of category map tables to obtain a set of candidate vector, said set of candidate vector comprising a plurality of categories associated with each word;
   (iii) generating, by said processor, a plurality of category vectors based on at least one category from among said plurality of categories, wherein each category vector is specific to said at least one sentence based on said at least one category;
   (iv) applying, by said processor, rule functions on said plurality of category vectors, wherein said rule functions are set operations that are applied on said plurality of category vectors, wherein each rule function of said rule functions comprises a rule vector and attributes that are specific to said rule vector;
   (v) generating, by said processor, a plurality of numbers by applying said rule function on said plurality of category vectors;
   (vi) generating, by said processor, a candidate classification decision matrix based on said plurality of numbers which are obtained by applying said rule functions on said plurality of category vectors, wherein said candidate classification decision matrix comprises (i) results of each rule function applied on each said category vector, and (ii) a rectangular array of rows and columns having said plurality of numbers; and
   (vii) classifying, by said processor, said text fragment based on said candidate classification decision matrix.

2. The method of claim 1, further comprising applying, by said processor, a rule selector on said rule functions to select an attribute associated with a rule function from said rule functions based on a number of non-zero values in said candidate classification decision matrix, wherein said attribute comprises at least one of a weight, a distance threshold, a vector threshold, a size selector, a position selector, and an attribute rule vector.

3. The method of claim 2, further comprising computing, by said processor, a decision matrix based on said candidate classification decision matrix and said rule selector, wherein said decision matrix is a result of dot product of said candidate classification decision matrix and said rule selector, and wherein said rule selector is a matrix comprising a rectangular array of rows and columns defining selection of attributes from a rule function.

4. The method of claim 3, further comprising computing, by said processor, a text rank for said text fragment based on said decision matrix.

5. The method of claim 4, wherein said text rank is computed based on a result vector, wherein said result vector is computed based on weights associated with said rule functions of said decision matrix.

6. The method of claim 5, wherein said text fragment is classified based on said text rank.

7. A system for classifying a text fragment by applying one or more rule functions, said system comprising:
   (a) a memory unit that stores (i) a set of modules, and (ii) a database;
   (b) a display unit; and
   (c) a processor that executes said set of modules, wherein said set of modules comprise:
      (i) a word obtaining module, executed by said processor, that obtains a set of words from at least one sentence of said text fragment obtained a multimedia content;
      (ii) a mapping module, executed by said processor, that maps each word from said at least one sentence with said set with a plurality of category map tables to obtain a set of candidate vector, said set of candidate vector comprising a plurality of categories associated with each word;
      (iii) a category vector generation module, executed by said processor, that generates a plurality of category vectors, wherein each category vector is specific to said at least one sentence based on at least one category from among said plurality of categories;
      (iv) a rule function module, executed by said processor, that applies rule functions on said plurality of category vectors, wherein said rule functions are set operations that are applied on said plurality of category vectors ,wherein each rule function of said rule functions comprises a rule vector and attributes that are specific to said rule vector;
      (v) generating, by said processor, a plurality of numbers by applying said rule function on said plurality of category vectors;
      (vi) a candidate matrix generation module, executed by said processor, that generates a candidate classification decision matrix based on said plurality of numbers which are obtained by applying said rule functions on said plurality of category vectors, wherein said candidate classification decision matrix comprises (i) results of each rule function applied on each said category vector, and (ii) a rectangular array of rows and columns having said plurality of numbers; and (vii) a text fragment classification module, executed by said processor, that classifies said text fragment based on said candidate classification decision matrix.

8. The system of claim 7, wherein set of modules further comprise a rule selector module, executed by said processor, that applies a rule selector to select an attribute associated with a rule function from said rule functions based on a number of non-zero values in said candidate classification decision matrix, wherein said attribute comprises at least one of a weight, a distance threshold, a vector threshold, a size selector, a position selector, and an attribute rule vector.

9. The system of claim 8, wherein said set of modules further comprise a decision matrix computation module, executed by said processor, that computes a decision matrix based on said candidate classification decision matrix and said rule selector, wherein said decision matrix is a result of dot product of said candidate classification decision matrix and said rule selector, and wherein said rule selector is a matrix comprising a rectangular array of rows and columns defining selection of attributes from a rule function.

10. The system of claim 9, wherein said set of modules further comprise a text rank computation module, executed by said processor, that computes a text rank for said text fragment based on said decision matrix.

11. The system of claim 10, wherein said text rank is computed based on a result vector, wherein said result vector is computed based on weights associated with said rule functions of said decision matrix.

12. The system of claim 11, wherein said text fragment is classified based on said text rank.

13. A non-transitory program storage device readable by a computer, and comprising a program of instructions executable by said computer to perform a method for classifying a text fragment obtained from a multimedia content, wherein said text fragment is classified based on a text rank by applying one or more rule functions, said method comprising:

(i) obtaining a set of words of at least one sentence of said text fragment;

(ii) mapping each word from said set of words with a plurality of category map tables to obtain a set of candidate vectors, said set of candidate vector comprising a plurality of categories associated with each word;

(iii) generating a plurality of category vectors based on at least one category from among said plurality of categories, each category vector is specific to at least one sentence based on said at least one category;

(iv) applying rule functions on said plurality of category vectors, wherein said rule functions are set operations that are applied on said plurality of category vectors, wherein each rule function of said rule functions comprises a rule vector and attributes that are specific to said rule vector;

(v) generating a plurality of numbers by applying said rule function on said plurality of category vectors;

(vi) generating a candidate classification decision matrix based on said plurality of numbers which are obtained by applying said rule functions on said plurality of category vectors, wherein said candidate classification decision matrix comprises (i) results of each rule function applied on each said category vector , and (ii) a rectangular array of rows and columns having said plurality of numbers;

(vii) applying a rule selector to select an attribute associated with a rule function from said rule functions based on a number of non-zero values in said candidate classification decision matrix, wherein said attribute comprises at least one of a weight, a distance threshold, a vector threshold, a size selector, a position selector, and an attribute rule vector;

(viii) computing a decision matrix by multiplying each column of said candidate classification decision matrix with corresponding column element of a transpose of said rule selector;

(ix) computing a text rank for said text fragment based on said decision matrix; and (x) classifying said text fragment based on said text rank.

14. The non-transitory program storage device of claim 13, wherein said text rank is computed based on a result vector, wherein said result vector is computed based on weights associated with said rule functions of said decision matrix.

* * * * *